United States Patent
Bauer et al.

(10) Patent No.: US 9,914,842 B2
(45) Date of Patent: Mar. 13, 2018

(54) PLASTICIZER FOR MASTICS, PLASTISOLS AND ADHESIVES

(71) Applicant: TOTAL MARKETING SERVICES, Puteaux (FR)

(72) Inventors: Thorsten Bauer, Ibbenbüren (DE); Franck Bardin, Chambourcy (FR); Antoine Westelynck, Brueil en Vexin (FR)

(73) Assignee: Total Marketing Services, Puteaux (FR)

( * ) Notice: Subject to any disclaimer, the term of this patent is extended or adjusted under 35 U.S.C. 154(b) by 0 days.

(21) Appl. No.: 15/105,855

(22) PCT Filed: Dec. 17, 2014

(86) PCT No.: PCT/EP2014/078306
§ 371 (c)(1),
(2) Date: Jun. 17, 2016

(87) PCT Pub. No.: WO2015/091694
PCT Pub. Date: Jun. 25, 2015

(65) Prior Publication Data
US 2016/0319138 A1 Nov. 3, 2016

(30) Foreign Application Priority Data

Dec. 20, 2013 (FR) ..................... 13 63235

(51) Int. Cl.
| | |
|---|---|
| *C08K 5/01* | (2006.01) |
| *C08K 5/04* | (2006.01) |
| *C09D 7/12* | (2006.01) |
| *C09D 5/34* | (2006.01) |
| *C09J 11/06* | (2006.01) |
| *C08G 65/336* | (2006.01) |
| *C08L 71/02* | (2006.01) |
| *C08L 71/00* | (2006.01) |
| *C09D 171/00* | (2006.01) |
| *C09J 171/00* | (2006.01) |
| *C08K 5/00* | (2006.01) |
| *C08K 5/05* | (2006.01) |

(52) U.S. Cl.
CPC ......... *C09D 7/1233* (2013.01); *C08G 65/336* (2013.01); *C08L 71/00* (2013.01); *C08L 71/02* (2013.01); *C09D 5/34* (2013.01); *C09D 171/00* (2013.01); *C09J 11/06* (2013.01); *C09J 171/00* (2013.01); *C08K 5/0016* (2013.01); *C08K 5/05* (2013.01)

(58) Field of Classification Search
None
See application file for complete search history.

(56) References Cited

U.S. PATENT DOCUMENTS

| | | | |
|---|---|---|---|
| 3,366,707 A | * | 1/1968 | Delalande ............... C08L 21/00 428/355 AK |
| 7,931,744 B2 | | 4/2011 | Chaverot et al. |
| 8,785,354 B2 | | 7/2014 | Westelynck et al. |
| 2001/0044486 A1 | | 11/2001 | Wesch |
| 2009/0030118 A1 | | 1/2009 | Lapalu et al. |
| 2010/0154674 A1 | | 6/2010 | Chaverot et al. |
| 2011/0319539 A1 | | 12/2011 | Westelynck |

FOREIGN PATENT DOCUMENTS

| | | | | |
|---|---|---|---|---|
| EP | 2361949 A1 | * | 8/2011 | ............... C08K 3/36 |
| EP | 2361949 A1 | | 8/2011 | |
| WO | WO-2007/006489 A1 | | 1/2007 | |

* cited by examiner

*Primary Examiner* — Richard A Huhn
(74) *Attorney, Agent, or Firm* — Harness, Dickey & Pierce, PLC

(57) ABSTRACT

The disclosure relates to a plasticizer for mastics, plastisols and adhesives. The plasticizer includes at least one functionalized hydrocarbon-containing cut, in particular hydroxylated. The disclosure also relates to the mastic, plastisol and adhesive compositions including the plasticizer. The present disclosure also relates to the use of the plasticizer for reducing the phenomenon of bleeding in mastics, plastisols and adhesives.

23 Claims, No Drawings

US 9,914,842 B2

PLASTICIZER FOR MASTICS, PLASTISOLS AND ADHESIVES

CROSS-REFERENCE TO RELATED APPLICATIONS

This application is a National Phase Entry of International Patent Application No. PCT/EP2014/078306, filed on Dec. 17, 2014, which claims priority to French Patent Application Serial No. 1363235, filed on Dec. 20, 2013, both of which are incorporated by reference herein.

TECHNICAL FIELD

The invention relates to a functionalized hydrocarbon-containing cut, in particular hydroxylated, that can be used as a plasticizer in the formulation of mastics, plastisols and adhesives. The invention also relates to the mastic, plastisol and adhesive compositions comprising said plasticizer. The present invention also relates to the use of said plasticizer for reducing the phenomenon of bleeding in mastics, plastisols and adhesives.

BACKGROUND

Numerous products are used in construction materials, for example for floor coverings, mastics or also sanitary seals. The addition of plasticizers is common in certain families of mastics such as the hybrid mastics (based on siliconized modified polymers), acrylic mastics, polyurethane mastics, plastisols (PVC paste) and certain adhesives. A plasticizer is a molecule or an oligomer, in the solid state or in the more or less viscous liquid state, added to the formulations of different types of materials in order to make them more flexible, more resistant, more resilient or easier to handle.

An ideal plasticizer is compatible with the polymer matrix in order to prevent the phenomena of migration and bleeding, has low volatility, can be extracted only with difficulty by the liquids that will be in contact with the plasticized material, it performs well with regard to certain properties such as flexibility, resistance to impact, cold, heat and has good electrical resistivity. It does not become oxidized and remains non-toxic, odourless, colourless and inexpensive.

The phthalates are products very commonly used as a plasticizer. But the pressure of increasingly stringent regulations restricts their uses in many countries due to their danger to human health. Alternatives to their use are now therefore necessary and much sought-after.

On the other hand, recent regulatory constraints imposed by limitations on volatile organic compounds or VOCs in construction materials are also to be taken into account. In fact, these compounds have a tendency to evaporate and/or degrade either immediately or over time and to be a source of emissions that are often toxic to the environment and more particularly to human and animal health. These emissions affecting everyday life constitute a significant source of pollution inside homes, offices and administrative buildings and any enclosed space with limited ventilation. These emissions may be greatest when the materials are applied, but there may also be a longer-term effect due to residual volatility over time or even linked to the gradual degradation of the covering or of the adhesive or mastic composition.

Hydrocarbon-containing fluids of the gas oil, kerosene or white spirit type can also be used as a secondary plasticizer in different formulations including polymers or resins. This is the case for the mastics or PVC pastes. But their use is now limited by their lower compatibility in the polymer compared with phthalates. Phenomena of surface migration, bleeding, and surface appearance defects that have been noted prevent the production of formulae without phthalates containing only hydrocarbon-containing fluids.

Due to the increasing regulatory constraints, a technical solution is required in order to allow the replacement of the phthalates in stable and economically advantageous formulations of construction materials with a low VOC content. One of the main objectives of the applicant is therefore to propose a novel phthalate-free plasticizer, for the formulation of construction materials and materials intended for the automotive sector such as mastics, plastisols or certain types of adhesives. Another of the objectives of the applicant is to obtain a plasticizer with a non-VOC nature, for the formulation of construction materials, materials based on resins or materials used in the automotive sector such as mastics, plastisols or certain types of adhesives.

Another objective of the applicant is to propose a plasticizer allowing the formulation of mastics, plastisols and adhesives having satisfactory resistance to UV radiation. Another objective of the applicant is to propose a plasticizer allowing the formulation of mastics, plastisols and adhesives having satisfactory hardening, in particular according to the standard DIN ISO 7619 (for mastics). Another objective of the applicant is to propose a plasticizer allowing the formulation of mastics, plastisols and adhesives which exhibit no bleeding.

Another objective of the applicant is to propose a plasticizer allowing the formulation of mastics, plastisols and adhesives having satisfactory drying, i.e. drying in less than 24 hours for a film with a thickness of 2 mm. Another objective of the applicant is to propose a plasticizer allowing the formulation of mastics, plastisols and adhesives having a suitable dynamic viscosity, i.e. a viscosity comprised between 2,000 and 8,000 Pa·s at 23° C. (Rheomètre Physica Rheolab—Needle Z4—speed: 1 rpm.). Another objective of the applicant is to propose a plasticizer allowing the formulation of mastics, plastisols and adhesives having a satisfactory skin-formation time, i.e. a skin formation time at ambient temperature comprised between 5 and 60 minutes.

Another objective of the applicant is to propose a plasticizer allowing the formulation of mastics, plastisols and adhesives having a good shear resistance according to the standard DIN EN 14293 (for mastics). Another objective of the applicant is to propose a plasticizer allowing the formulation of mastics, plastisols and adhesives having a suitable modulus of elasticity according to the standard DIN 53504 or according to the standard DIN 52455-1 (for mastics). Another objective of the applicant is to propose a plasticizer allowing the formulation of mastics, plastisols and adhesives having good tensile strength according to the standard DIN 53504 (for mastics). Another objective of the applicant is to propose a plasticizer allowing the formulation of mastics, plastisols and adhesives having satisfactory elongation at break according to the standard DIN 53504 (for mastics). Another objective of the applicant is to propose a plasticizer allowing the formulation of mastics, plastisols and adhesives having a satisfactory elastic recovery according to the standard DIN EN ISO 7389 (for mastics).

SUMMARY

These objectives are achieved due to a novel type of plasticizer. The invention therefore relates to a plasticizer for mastics, plastisols, and adhesives comprising at least one hydrocarbon-containing cut characterized in that the hydrocarbon-containing cut is functionalized, in particular functionalized by at least one group comprising a heteroatom, such as the oxygen, sulphur, phosphorus and/or nitrogen atoms.

Preferably, the invention relates to a plasticizer for mastics, plastisols, and adhesives comprising a hydrocarbon-containing cut functionalized by at least one group comprising an oxygen atom. Preferably, the invention relates to a plasticizer for mastics, plastisols, and adhesives comprising a hydrocarbon-containing cut functionalized by at least one group selected from the hydroxyl, ester, carboxylic acid and/or ketone groups. Preferably, the functionalized hydrocarbon-containing cut mainly comprises hydroxyl groups. Preferably, the functionalized hydrocarbon-containing cut comprises from 1 to 20 mole % hydroxyl groups, preferably from 5 to 10%.

Preferably, the hydrocarbon-containing cut is a hydrotreated, hydrocracked and/or catalytically cracked hydrocarbon-containing cut or an olefinic hydrocarbon-containing cut. Preferably, the hydrocarbon-containing cut is a de-aromatized and/or desulphurized hydrocarbon-containing cut or an olefinic hydrocarbon-containing cut. Preferably, the hydrocarbon-containing cut has a boiling point comprised between 240 and 400° C.

Preferably, the hydrocarbon-containing cut has a kinematic viscosity at 40° C. comprised between 1 and 22 $mm^2/s$ according to the standard ASTM D445. Preferably, the hydrocarbon-containing cut has a pour point ranging from −40 to +10° C. according to the standard ASTM D97. Preferably, the hydrocarbon-containing cut has a content of aromatic compounds measured by UV spectroscopy less than 300 ppm, preferably less than 200 ppm. Preferably, the plasticizer comprises less than 1% by weight of phthalates with respect to the weight of plasticizer.

A subject of the invention is also a composition of mastics, plastisols or adhesives comprising:
- at least one polymer selected from the group consisting of a polyether comprising two silane-type terminal functions, a polyurethane comprising two silane-type terminal functions or a mixture thereof, a polyvinyl chloride, an ethylene-vinyl acetate copolymer, a polyethylene, a polypropylene, a polyamide;
- the plasticizer as described above;
- at least one compound selected from the group consisting of a thickener, a filler, a cross-linking agent, a cross-linking catalyst and a tackifier resin, or a mixture thereof.

Preferably, the composition of mastics, plastisols and adhesives comprises from 1 to 30% by mass of plasticizer, with respect to the mass of the composition of mastics, plastisols and adhesives, preferably from 2 to 20% and more preferably from 5 to 15%.

According to an embodiment, the composition is a mastic composition comprising:
- at least one polymer selected from the group consisting of a polyether comprising two silane-type terminal functions, a polyurethane comprising two silane-type terminal functions, or a mixture thereof;
- the plasticizer as described above;
- and at least one cross-linking agent.

According to an embodiment, the composition is a plastisol composition comprising:
- at least one polymer selected from the group consisting of a polyvinyl chloride or an ethylene-vinyl acetate,
- the plasticizer as described above,
- a filler.

According to an embodiment, the composition is an adhesive composition comprising:
- at least one polymer consisting of a polyethylene, a polypropylene, a polyamide or a polyurethane,
- an ethylene-vinyl acetate copolymer,
- the plasticizer as described above,
- a tackifier resin.

The invention finally relates to the use of the plasticizer as described above for reducing the phenomenon of bleeding in mastics, plastisols or adhesives.

DETAILED DESCRIPTION

The plasticizer according to the invention comprises at least one hydrocarbon-containing cut. This hydrocarbon-containing cut has the feature of being functionalized. By functionalized hydrocarbon-containing cut according to the invention, is meant a hydrocarbon-containing cut that has been chemically modified by the introduction of heteroatoms. The introduction of these heteroatoms confers polar properties on the plasticizer according to the invention or generates electronic interactions capable of creating affinities with the polymer network present in the mastics, plastisols or adhesives. The polar and/or electronic interactions make it possible to reduce the phenomena of bleeding.

The heteroatoms are for example oxygen, sulphur, nitrogen and/or phosphorus atoms, preferably the heteroatoms are oxygen atoms. When the heteroatoms are oxygen atoms, the groups present in the hydrocarbon-containing cut are, for example, hydroxyl, ketone, carboxylic acid and/or ester groups. The hydrocarbon-containing cut comprises one type of group or several types of groups in a mixture.

Preferably, the functionalized hydrocarbon-containing cut comprises mainly hydroxyl functions; it can be described as a hydroxylated hydrocarbon-containing cut. The functionalized hydrocarbon-containing cut comprises from 1 to 20 mole % of hydroxyl groups, preferably from 5 to 10%.

According to an embodiment of the invention, these hydroxyl functions are for example introduced into the hydrocarbon-containing cut by reaction of an oxidizing agent such as m-CPBA (m-chloro-peroxybenzoic acid), oxone, hydroperoxide, t-butyl hydroperoxide, in the presence of a metallic catalyst, for example based on nickel or iron. The oxidation preferably leads to the formation of hydroxyl functions on the hydrocarbon-containing cut, limiting the formation of ketone and/or acid functions.

According to a second embodiment of the invention, the functionalization of the hydrocarbon-containing cut can also be carried out by oxidation of a specific hydrocarbon-containing cut, i.e. an olefinic hydrocarbon-containing cut. A proposed solution is the conversion of internal or terminal olefins to diols. A possible process is an oxidation in an aqueous medium with hydrogen peroxide in order to form an epoxide, then a diol by hydrolysis.

According to a third embodiment of the invention, the functionalization of the hydrocarbon-containing cut can also be carried out by the addition of hydroxyl functions. A proposed solution is mixing the hydrocarbon-containing cut and a branched alcohol comprising between 14 and 22 carbon atoms such as the Guerbet alcohols comprising 16 to 20 carbon atoms (for example 2-octyl-1-decanol) and the branched alcohols comprising from 14 to 15 carbon atoms. The Guerbet alcohols as described in the literature are branched alcohols obtained by dimerization of aliphatic alcohols with the release of a molecule of water. This addition of the hydroxyl functions to the hydrocarbon-containing cut can for example be carried out by weighing then mixing with stirring from 20 to 70% by weight of branched alcohols and from 30 to 80% by weight of hydrocarbon-containing cut as described.

Preferably, the plasticizer according to the invention comprises at least one hydrocarbon-containing cut functionalized as described above, potentially in a mixture with a non-functionalized hydrocarbon-containing cut. The hydrocarbon-containing cut is constituted by linear, branched and/or cyclic alkanes, preferably C13 to C23. The hydrocarbon-containing cut can also be an olefinic hydrocarbon-containing cut, comprising linear, branched and/or cyclic alkanes, preferably C14-C22.

By hydrocarbon-containing cut within the meaning of the invention, is meant a cut originating from the distillation of crude oil, preferably originating from the atmospheric distillation and/or vacuum distillation of crude oil, preferably originating from atmospheric distillation followed by vacuum distillation. The hydrocarbon-containing cut according to the invention is preferably a gas oil cut. The hydrocarbon-containing cut according to the invention is also preferably subjected to stages of hydrotreatment, hydrocracking and/or catalytic cracking.

The hydrocarbon-containing cut according to the invention can also preferably be subjected to a stage of hydrodewaxing. The hydrocarbon-containing cut according to the invention is also, preferably, subjected to stages of de-aromatization and/or optionally of desulphurization. The hydrocarbon-containing cut can be a mixture of hydrocarbon-containing cuts subjected to the stages described above.

The hydrocarbon-containing cut as described above has a distillation range DR (in ° C.) such that 240≤DR≤400 and more preferably such that 240≤DR≤370. The hydrocarbon-containing cut can comprise one or more fractions with distillation ranges comprised within that of said cut. The hydrocarbon-containing cut of gas oil type according to the invention generally comprises more than 50% by weight of paraffinic compounds, preferably more than 60%, even more preferably more than 65%.

The hydrocarbon-containing cut according to the invention is generally constituted by a majority of isoparaffins and a minority of normal paraffins. Preferably, the hydrocarbon-containing cut contains more than 50% by weight of isoparaffins and less than 20% by weight of normal paraffins. The hydrocarbon-containing cut according to the invention generally comprises less than 50% by weight of naphthenic compounds, preferably less than 45%, even more preferably less than 40%.

The hydrocarbon-containing cut according to the invention is preferably free of aromatics. By "free" is meant, a hydrocarbon-containing cut comprising less than 300 ppm of aromatics, preferably less than 200 ppm measured by UV spectrometry. Preferably, the hydrocarbon-containing cut according to the invention has a sulphur content less than 10 ppm and preferably less than 2 ppm.

The hydrocarbon-containing cut according to the invention generally has a kinematic viscosity at 40° C. comprised between 1 and 22 mm$^2$/s, preferably between 2 and 15 mm$^2$/s and more preferably between 2 and 13 mm$^2$/s according to the standard ASTM D445. The hydrocarbon-containing cut according to the invention has a pour point according to the standard ASTM D97 comprised between −40 and +10° C., preferably comprised between −30 and 0° C., even more preferably comprised between −20 and 0° C. The hydrocarbon-containing cut according to the invention also has the advantage of being easily available on the market, being relatively economical within the chain of oil distillation products.

The plasticizer according to the invention is free of phthalate-type compounds. By "free" according to the invention, is meant a plasticizer comprising less than 1% by mass of phthalates, with respect to the mass of plasticizer, preferably less than 0.5%, more preferably less than 0.1%, even more preferably less than 0.01%. The plasticizer according to the invention generally has a kinematic viscosity at 40° C. comprised between 5 to 22 mm$^2$/s, preferably between 5 and 15 mm$^2$/s according to the standard ASTM D445.

The invention also relates to compositions of mastics, plastisols and adhesives comprising the plasticizer described above. The invention also relates to a mastic composition comprising at least one polymer selected from the group consisting of a polyether comprising two silane-type terminal functions, a polyurethane comprising two silane-type terminal functions, or a mixture thereof, the plasticizer composition as described above and at least one cross-linking agent. Preferably, the polymer is a polyether comprising two silane-type terminal functions.

Advantageously the mastic composition comprises from 10 to 50% by weight of said polymer, preferably from 20 to 30%. Advantageously the mastic composition comprises from 10 to 30% by weight of said plasticizer composition, preferably from 10 to 25%. In order to satisfy the mechanical and physico-chemical requirements, the mastic composition also comprises in a standard manner at least one compound selected from the group consisting of a thickener, a filler, a cross-linking agent and/or a catalyst.

The invention also relates to a plastisol composition comprising at least one polymer selected from the group consisting of a polyvinyl chloride and ethylene-vinyl acetate or EVA, with the plasticizer composition as described above and a filler. A subject of the invention is also an adhesive composition, preferably a thermoplastic adhesive composition, comprising at least one polymer consisting of a polyethylene, a polypropylene or a polyamide, an ethylene-vinyl acetate copolymer, the plasticizer composition as described above and a tackifier resin.

The compositions of mastics, plastisols and adhesives according to the invention comprise from 1 to 30% by mass of plasticizer, with respect to the mass of the composition, preferably from 2 to 20%, more preferably from 5 to 15%. The compositions of mastics, plastisols and adhesives according to the invention have the remarkable characteristic of containing less than 0.1% by weight of phthalates with respect to the mass of the composition, preferably less than 0.05%, more preferably less than 0.01%, even more preferably less than 0.001%. The compositions of thermoplastic mastics, plastisols and adhesives as described are without phthalates and with a low VOC content in order to satisfy the current regulatory requirements.

EXAMPLES

In the remainder of the present description, examples of the present invention are given by way of illustration and are in no case intended to limit its scope. Different hybrid mastic formulations based on silyl modified polymers (or SMPs) were assessed. These SMP mastics include the ST-PE (Silane terminated Polyether) and ST-PU (Silane terminated Polyurethane) product families.

The following examples describe the SMP mastic compositions comprising the different plasticizers below:
di-isodecyl phthalate (or DIDP) as a reference for the phthalates, in comparative Example 1, a functionalized hydrocracked hydrocarbon-containing cut, in particular a hydroxylated hydrocracked hydrocarbon-containing cut, in particular a hydroxylated cut HYDROSEAL G3H, in Example 2 according to the invention, a hydrodewaxed hydrocarbon-containing cut, in particular a HYDROSEAL G340H cut, in comparative Example 3, di-2-propyl-heptyl phthalate (DPHP) as a second reference for the phthalates, in comparative example 3.

The hydrocarbon-containing cut HYDROSEAL G3H is hydroxylated in the following way:

Preparation of the catalyst:

417 mg of iron (II) acetate and 697 mg of 2-methyl pyridine are added to 1.25 L of acetonitrile under an inert atmosphere. The mixture is stirred for 1 hour then 821 mg of sodium tetraphenyl borate is added. After mixing for 1 hour, the catalyst solution can be used for the hydroxylation reaction.

Hydroxylation of the hydrocarbon-containing cut HYDROSEAL G3H:

2.5 kg of hydrocarbon-containing cut HYDROSEAL G3H, the catalyst solution and 3.75 L of dichloromethane are added into a reactor. The mixture is heated to about 37° C., then 1.15 kg of m-chloro-peroxybenzoic acid (at 70%) dissolved in 2.6 L of dichloromethane and 0.9 L of acetonitrile are added slowly over a period of 40 minutes. Mixing is continued for 1 hour at 40° C. and then 0.013 equivalent of the catalyst solution of is added diluted in 200 mL of dichloromethane and 0.9 L of acetonitrile. 1.15 kg of m-chloro-peroxybenzoic acid (at 70%) dissolved in 2.6 L of dichloromethane and 0.9 L of acetonitrile are added slowly over a period of 40 minutes. Mixing is continued for 4 hours at 40° C., followed by cooling to 25° C. and mixing for 24 hours. The mixture is then cooled down to 5° C. and neutralized with a 2 M solution of sodium carbonate. After mixing for 15 minutes, the aqueous solution is extracted. The organic phase is then washed with 5.5 L of sodium carbonate and mixed for 30 minutes. After extraction of the aqueous phase, the organic phase is washed 3 times with 2.5 L of water and concentrated under vacuum. Then, 2 washings are carried out with 4 L of 2 M hydrochloric acid. After extraction of the aqueous phase, the organic phase is washed with 4 L of sodium hydroxide and 3 L of NaCl, then concentrated under vacuum in order to provide 2.2 kg of hydroxylated hydrocarbon-containing cut, with a quantity of alcohol of 24 mole % (determination by silylation of the hydroxylated hydrocarbon-containing cut in the presence of pyridine and trimethylsilyl chloride then $^1$H NMR analysis).

Table 1 summarizes the chemical characteristics of the ST-PE mastic used for the different evaluations. The formulation of Example 1 contains 17% by weight of a phthalate plasticizer which is Jayflex DIDP, with respect to the mass of the formulation. The formulation of Example 2 contains 17% by mass of a plasticizer which is a hydroxylated cut Hydroseal G3H, with respect to the mass of the formulation.

TABLE 1 chemical characteristics

| | Chemical nature/Properties | Comparative Example 1 composition (in % by mass) | Example 2 according to the invention composition (in % by mass) | Comparative Example 3 composition (in % by mass) |
|---|---|---|---|---|
| Polymer MS 203H | Polyether with silane-type terminal functions/Polymer | 15 | 15 | — |
| Polymer MS 303H | Polyether with silane-type terminal functions/Polymer | 10 | 10 | — |
| Polymer ST-PU ST-61 | Polyurethane with silane-type terminal functions/Polymer | — | — | 24.5 |
| Irganox 1076 | sterically hundered phenolic anti-oxidant | 0.2 | 0.2 | — |
| Jayflex DIDP | Di-isodecyl phthalate/Plasticizer | 17 | — | — |
| DPHP | Di 2-propyl heptyl phthalate/Plasticizer | — | — | 8 |
| DEV 1641-2 | Hydroxylated Hydroseal G3H/Plasticizer | — | 17 | — |
| Hydroseal HDW | Hydroseal G340H hydrodewaxed | — | — | 7 |
| Crayvallac SLX | PA-wax/thickener | 5.5 | 5.5 | 1 |
| — | Amorphous silica/Rheologic Agent | — | — | 1 |
| Carbital 110S | Chalk/filler | 49.9 | 49.9 | — |
| — | Calcium carbonate/Filler | — | — | 56 |
| Dynasilan VTMO | Vinyltrimethoxysilan/drying agent | 0.8 | 0.8 | — |
| — | Silane derivative/drying agent | — | — | 1.8 |
| Dynasilan AMMO | 3-Aminopropylmethoxysilane/cross-linking agent | 1.1 | 1.1 | — |
| — | Organosilane/cross-linking agent | — | — | 1.5 |

TABLE 1-continued

| | | Comparative Example 1 composition (in % by mass) | Example 2 according to the invention composition (in % by mass) | Comparative Example 3 composition (in % by mass) |
|---|---|---|---|---|
| | Chemical nature/Properties | | | |
| chemical characteristics | | | | |
| Tegokat 223 | Dioctyltindiethanolate/Catalyst | 0.3 | 0.3 | — |
| Tegokat 422 | Dioctyltin-silane-blend/Catalyst | 0.2 | 0.2 | — |
| — | Organic tin/catalyst | — | — | 0.2 |
| | TOTAL | 100 | 100 | 100 |

Table 2 summarizes the results obtained for the different formulations.

TABLE 2

| Characteristic | Comparative Example 1 DIDP | Example 2 according to the invention DEV 1641-2 | Comparative Example 3 Hydroseal HDW/DPHP |
|---|---|---|---|
| Mechanical properties | | | |
| Bleeding | No | No | Yes |
| Viscosity after 0 day/56 days (in Pa · s) (Internal method) | 6150/4800 | 4650/3450 | — |
| Skin-formation time (smoothing time) after 0 day/56 days (in min) (Internal method) | 8/10 | 49/55 | — |
| Shore A hardness after 28 days at ambient temperature (DIN ISO 7619) | 28 | 24 | — |
| Shear strength (application of the mastic to a wooden substrate) EN 281 after 3 days (in N/mm$^2$) (DIN EN 14293) | 0.795 | 0.496 | — |
| Shear strength (application of the mastic to a wooden substrate) EN 281 after 3 days (in mm) (DIN EN 14293) | 2.0 | 0.9 | — |
| Elasticity modulus at 100% (2 mm film) 3 days/28 days (in N/mm$^2$) (DIN 53504, S2) | 0.44/0.46 | 0.23/0.31 | — |
| Tensile strength (2 mm film) 3 days/28 days (in N/mm$^2$) (DIN 53504, S2) | 1.13/1.16 | 0.73/0.98 | — |
| Elongation at break at 3 days/28 days (in %) (DIN 53504, S2) | 1150/1150 | 1150/1100 | — |
| Elasticity modulus at 100% (cement cycle A) at ambient temperature (in N/mm$^2$) (DIN 52455-1) | 0.536 | 0.390 | — |
| Elasticity modulus at 100% (aluminium cycle A) at ambient temperature (in N/mm$^2$) (DIN 52455-1) | 0.518 | 0.398 | — |
| Elasticity modulus at 100% (cement cycle B) at ambient temperature (in N/mm$^2$) (DIN 52455-1) | 0.461 | 0.624 | — |
| Elasticity modulus at 100% (cement cycle B) at −20° C. (in N/mm$^2$) (DIN 52455-1) | 0.513 | 0.720 | — |
| Elasticity modulus at 100% (aluminium cycle B) at ambient temperature (in N/mm$^2$) (DIN 52455-1) | 0.511 | 0.522 | — |
| Elastic recovery at ambient temperature (in %) (DIN EN ISO 7389-B) | 64 | 68 | — |

These results show that it is impossible to replace 100% of the phthalates by a hydrodewaxed hydrocarbon-containing cut. Indeed, bleeding is observed with comparative example 3 which incorporates 7% of Hydroseal G340H, the hydroseal G340H being in mixture with phthalates of the DPHP type. The mechanical properties of ST-PU mastics have thus not been assessed. It should be noted that the mechanical properties of the ST-PE mastic containing the functionalized composition Hydroseal G3H as plasticizer are at least just as good as or even better than those of a mastic containing DIDP as plasticizer in particular for bleeding and elastic recovery (according to the standard DIN EN ISO 7389-B).

The invention claimed is:
1. A composition of mastics comprising:
(a) at least one polymer selected from a group of a polyether comprising two silane-type terminal functions, a polyurethane comprising two silane-type terminal functions, or a mixture thereof;

(b) a plasticizer comprising at least one hydrocarbon-containing cut which is functionalized; and (c) at least one cross-linking agent.

2. The composition of mastics according to claim 1, wherein the composition comprises from 1 to 30% by mass of the plasticizer, with respect to the mass of the composition of mastics.

3. The composition of mastics according to claim 1, further comprising;

(d) at least one compound selected from a group comprising a thickener, a filler, a cross-linking catalyst, or a mixture thereof.

4. The composition of mastics according to claim 1, wherein the hydrocarbon-containing cut is functionalized by at least one functional group selected from the group consisting of a heteroatom including at least one oxygen atom, at least one sulphur atom, at least one phosphorous atom, at least one nitrogen atom, or a combination thereof, at least one oxygen atom, at least one hydroxyl group, at least one ester group, at least one carboxylic acid group, at least one ketone group, and a combination thereof.

5. The composition of mastics according to claim 1, wherein the hydrocarbon-containing cut has a boiling point comprised between 240 and 400° C.

6. The composition of mastics according to claim 1, wherein the hydrocarbon-containing cut has a kinematic viscosity at 40° C. comprised between 1 and 22 mm$^2$/s according to the standard ASTM D445.

7. The composition of mastics according to claim 1, wherein the hydrocarbon-containing cut has a pour point ranging from −40 to +10° C. according to the standard ASTM D97.

8. The composition of mastics according to claim 1, wherein the plasticizer comprises less than 1% by weight of phthalates, with respect to the weight of the plasticizer.

9. A composition of plastisols comprising:

(a) at least one polymer selected from the group comprising a polyvinyl chloride or an ethylene-vinyl acetate copolymer;

(b) a plasticizer comprising at least one hydrocarbon-containing cut which is functionalized; and (c) a filler.

10. The composition of plastisols according to claim 9, further comprising:

(d) a thickener, a cross-linking agent, a cross-linking catalyst, a tackifier resin, or a mixture thereof.

11. The composition of plastisols according to claim 9, wherein the composition comprises from 1 to 30% by mass of the plasticizer, with respect to the mass of the composition of plastisols.

12. The composition of plastisols according to claim 9, wherein the hydrocarbon-containing cut is functionalized by at least one functional group selected from the group consisting of a heteroatom including at least one oxygen atom, at least one sulphur atom, at least one phosphorous atom, at least one nitrogen atom, or a combination thereof, at least one oxygen atom, at least one hydroxyl group, at least one ester group, at least one carboxylic acid group, at least one ketone group, and a combination thereof.

13. The composition of plastisols according to claim 9, wherein the hydrocarbon-containing cut has a boiling point comprised between 240 and 400° C.

14. The composition of plastisols according to claim 9, wherein the hydrocarbon-containing cut has a kinematic viscosity at 40° C. comprised between 1 and 22 mm$^2$/s according to the standard ASTM D445.

15. The composition of plastisols according to claim 9, wherein the hydrocarbon-containing cut has a pour point ranging from −40 to +10° C. according to the standard ASTM D97.

16. The composition of plastisols according to claim 9, wherein the plasticizer comprises less than 1% by weight of phthalates, with respect to the weight of the plasticizer.

17. A composition of adhesives comprising:

(a) at least one polymer comprising a polyethylene, a polypropylene, a polyamide or a polyurethane;

(b) a plasticizer comprising at least one hydrocarbon-containing cut which is functionalized;

(c) an ethylene-vinyl acetate copolymer; and (d) a tackifier resin.

18. The composition of adhesives according to claim 17, further comprising:

(d) a thickener, a filler, a cross-linking agent, a cross-linking catalyst, or a mixture thereof.

19. The composition of adhesives according to claim 17, wherein the composition comprises from 1 to 30% by mass of the plasticizer, with respect to the mass of the composition of plastisols.

20. The composition of adhesives according to claim 17, wherein the hydrocarbon-containing cut is functionalized by at least one functional group selected from the group consisting of a heteroatom including at least one oxygen atom, at least one sulphur atom, at least one phosphorous atom, at least one nitrogen atom, or a combination thereof, at least one oxygen atom, at least one hydroxyl group, at least one ester group, at least one carboxylic acid group, at least one ketone group, and a combination thereof.

21. The composition of adhesives according to claim 17, wherein the hydrocarbon-containing cut has a boiling point comprised between 240 and 400° C.

22. The composition of adhesives according to claim 17, wherein the hydrocarbon-containing cut has a kinematic viscosity at 40° C. comprised between 1 and 22 mm$^2$/s according to the standard ASTM D445.

23. The composition of adhesives according to claim 17, wherein the plasticizer comprises less than 1% by weight of phthalates, with respect to the weight of the plasticizer.

* * * * *